(Model.)
2 Sheets—Sheet 1.
B. P. JOINER.
WAGON BED.
No. 249,531.
Patented Nov. 15, 1881.
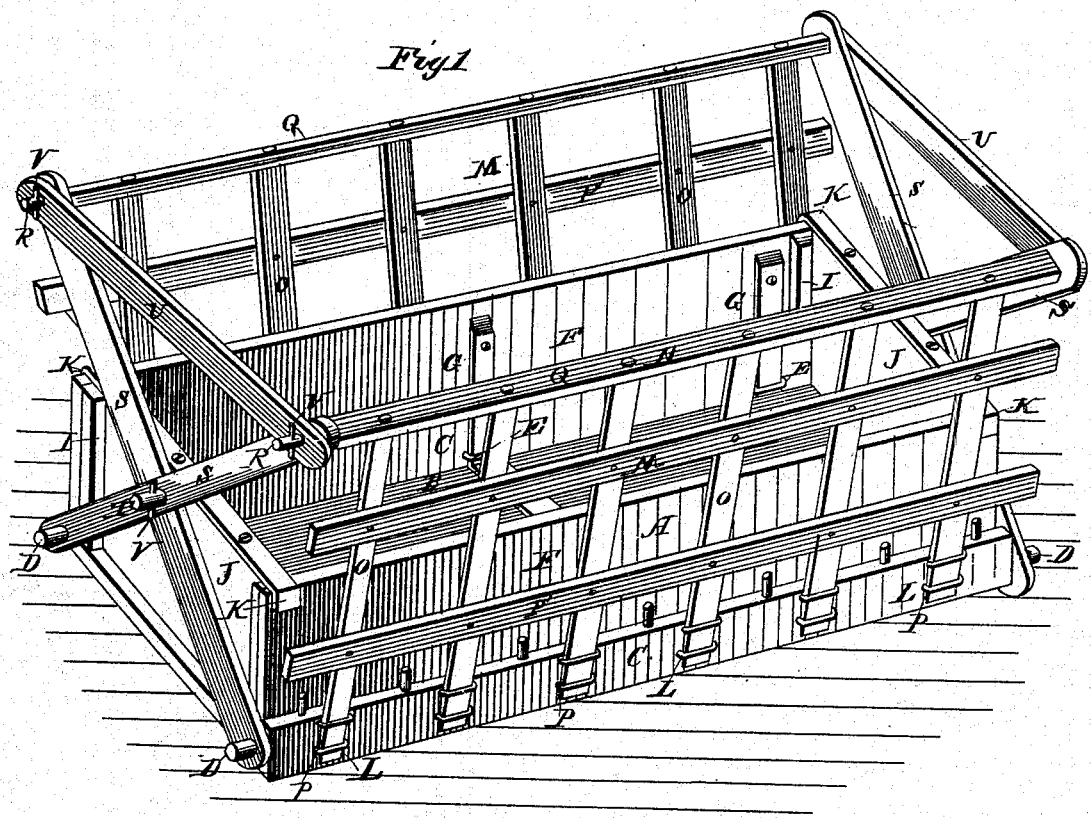
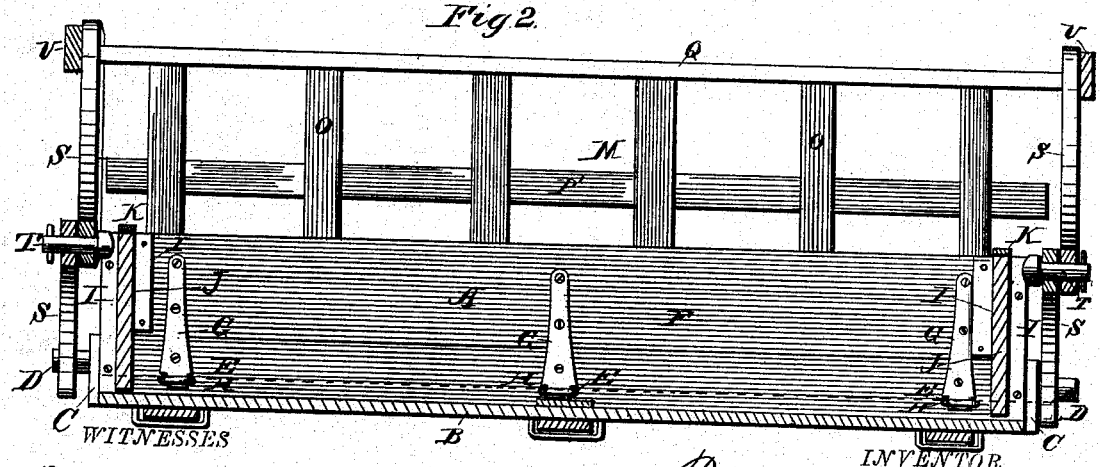

(Model.) 2 Sheets—Sheet 2.
B. P. JOINER.
WAGON BED.
No. 249,531. Patented Nov. 15, 1881.
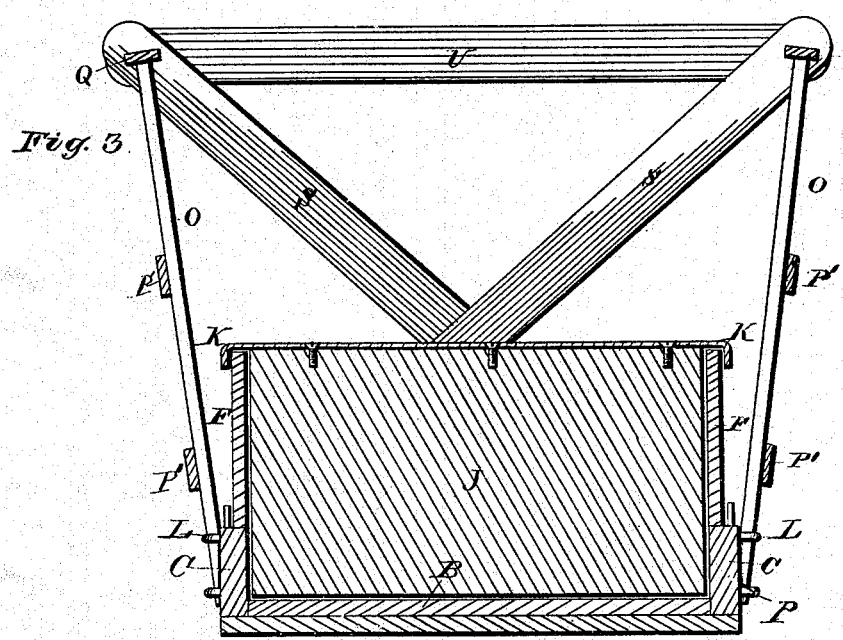
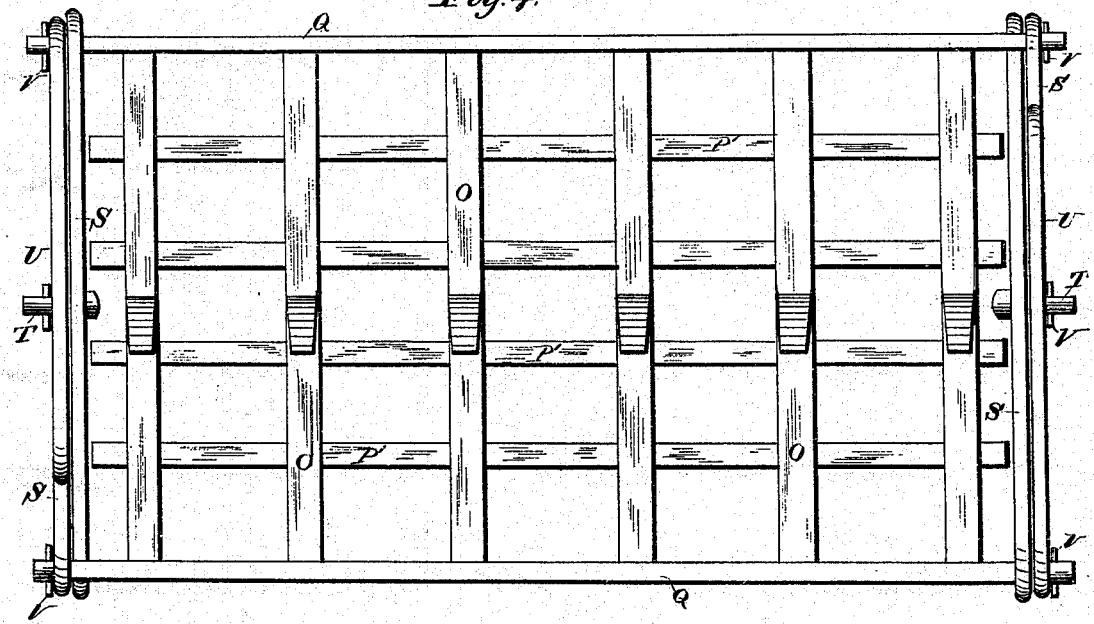
WITNESSES
Fred. G. Dieterich
Will R. Onohundro
INVENTOR,
Brantley P. Joiner
By his Attorneys,
Louis Bagger & Co.

United States Patent Office.

BRANTLEY P. JOINER, OF FLORENCE, ALABAMA.

WAGON-BED.

SPECIFICATION forming part of Letters Patent No. 249,531, dated November 15, 1881.

Application filed June 28, 1881. (Model.)

*To all whom it may concern:*

Be it known that I, BRANTLEY P. JOINER, of Florence, in the county of Lauderdale, and State of Alabama, have invented certain new and useful Improvements in Wagon-Beds; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view. Fig. 2 is a vertical sectional view. Fig. 3 is a vertical sectional view through one of the end-gates; and Fig. 4 is a view of the wagon-rack detached and folded.

Corresponding parts in the several figures are denoted by like letters of reference.

This invention relates to certain improvements in wagon beds and racks, the nature, construction, and operation of which will be hereinafter fully described, and particularly pointed out in the claim.

In the drawings hereto annexed, A represents the wagon-body, which consists of the bottom B, having side rails, C, rigidly secured thereto, and provided with projecting ends D, forming pivots for the end bars of the rack, as will be hereinafter described. The side rails, C, are provided upon their inner sides with loops or bails E, as shown.

F F are the side-boards of the wagon-box, which are provided upon their inner sides with straps G G, hooked at their lower ends, so as to be capable of engaging the loops or bails E E, and forming with them hinges H H, which retain the side-boards in juxtaposition to the side rails, C, and permit them to be folded down upon the bottom when required, as shown in dotted lines in Fig. 2 of the drawings.

The side-boards F are provided near their ends with vertical cleats I to accommodate the end boards or gates J, which are provided at their upper corners with clamps K, serving at the same time to secure the said end-gates and to secure the side-boards in a vertical or upright position.

The side rails, C, are provided upon their outer sides with loops or bails L to retain in position the detachable folding rack M, the construction of which is as follows: N N are side pieces or panels, consisting of vertical rods O, the lower ends of which are beveled at P, so as to enter the loops or staples L and fit against the side rails of the wagon-body. The rods O are connected by longitudinal rods P' P' and caps Q, which latter have projecting ends or pivots R.

S S are end or connecting bars, pivoted upon the said pivots R, and connected by central pivots, T, which permit the lower ends of the said bars to be extended and adjusted upon the extending ends D of the side rails, C. The projecting ends or pivots R are connected by braces U. Pins V are employed to secure the parts in position, as shown.

From the foregoing description, taken in connection with the drawings hereto annexed, the operation of my invention will be readily understood.

The wagon-box may be used with or without the rack, and the latter, when not in use, may be folded, as shown in Fig. 4, and stored against the wall of a barn, or in any place where it will be out of the way. The sides of the wagon-box may, when the end-gates are removed, be folded down upon the bottom, thus adapting the wagon for hauling bales or hogsheads, and the rack, when required, may be conveniently handled and adjusted by one man.

Having thus described my invention, I claim and desire to secure by Letters Patent of the United States—

The combination, in a wagon bed or body, of the bottom B, having stationary side rails, C, provided with the projecting ends D, inside bails, E, and outside loops or staples, L, detachable side-boards F, having hooked straps G, end-gates J, provided with the hooked clamping-rails K, and detachable folding rack M, all constructed and combined substantially in the manner and for the purpose herein shown and specified.

In testimony that I claim the foregoing as my own I have hereunto affixed my signature in presence of two witnesses.

BRANTLEY P. JOINER.

Witnesses:
JAMES R. PRICE,
L. B. LITTEN.